US006827646B2

(12) United States Patent
Adams

(10) Patent No.: US 6,827,646 B2
(45) Date of Patent: *Dec. 7, 2004

(54) SLOT MACHINE WITH AN ADDITIONAL PAYOUT INDICATOR

(75) Inventor: William R. Adams, Las Vegas, NV (US)

(73) Assignee: IGT, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 10/243,254

(22) Filed: Sep. 13, 2002

(65) Prior Publication Data

US 2003/0114216 A1 Jun. 19, 2003

Related U.S. Application Data

(63) Continuation of application No. 09/169,666, filed on Oct. 9, 1998, now abandoned, which is a continuation of application No. 08/907,764, filed on Aug. 8, 1997, now Pat. No. 5,848,932, and a continuation-in-part of application No. 08/311,783, filed on Sep. 23, 1994, now abandoned.

(51) Int. Cl.7 ............................................. G07F 17/34
(52) U.S. Cl. ........................ 463/20; 463/25; 273/143 R; 273/138.1; 273/138.2
(58) Field of Search .......................... 273/143 R, 138.1, 273/138.2, 142 R, 142 H; 463/20, 16, 1

(56) References Cited

U.S. PATENT DOCUMENTS

| | | | |
|---|---|---|---|
| 3,819,186 A | 6/1974 | Hinterstocker | 273/138 A |
| 3,975,022 A | 8/1976 | Figueroa | 273/141 A |
| 4,095,795 A | 6/1978 | Saxton et al. | 273/143 R |
| 4,149,728 A | 4/1979 | Thompson | 273/274 |
| 4,321,673 A | 3/1982 | Hawwass et al. | 364/412 |
| 4,448,419 A | 5/1984 | Telnaes | 273/143 R |
| 4,492,378 A | 1/1985 | Williams | 273/142 |
| 4,560,171 A | 12/1985 | Anthony | 273/269 |
| 4,573,681 A | 3/1986 | Okada | 273/143 R |
| 4,624,459 A | 11/1986 | Kaufman | 273/143 R |
| 4,660,833 A | 4/1987 | Dickinson et al. | 273/143 R |

(List continued on next page.)

FOREIGN PATENT DOCUMENTS

| | | |
|---|---|---|
| AU | 39332/78 | 3/1980 |
| AU | 75789/81 | 9/1981 |
| AU | 21070/92 | 8/1992 |
| AU | 79361/91 | 10/1992 |
| AU | 80248/91 | 12/1992 |
| DE | 30 35 898 A1 | 4/1982 |
| DE | 30 35 947 A1 | 5/1982 |
| DE | 31 39 587 A1 | 4/1983 |
| DE | 32 13 400 A1 | 10/1983 |

(List continued on next page.)

OTHER PUBLICATIONS

Bueschel, Richard M., "Lemons, Cherries and Bell–Fruit Gum," published by Royal Bell Books, Denver, Colorado, cover, p. iii, 23 and 31–48 describing "Wheels of Fortune" slot machines from 1895–1904.

Fey, Marshall, "Slot Machines—A Pictorial History of the First 100 Years," Fourth Edition, published by Liberty Belle Books, 1994, cover and p. 1, 6, 17, 19–20, 30–32, 34, 68, 70–73, 77–79, 86–88, 90, 92–93, 96, 98–99, 128, 150, 154, 158–159, 230, 232–234 and 237.

(List continued on next page.)

*Primary Examiner*—Benjamin Layno
(74) *Attorney, Agent, or Firm*—Marshall, Gerstein & Borun, LLP.

(57) ABSTRACT

Gaming devices comprising a standard gaming unit, e.g., three reels, and a discernible additional payout indicator, e.g., a rotatable wheel. A preferred bonus payout indicator is clearly visible by the player and is actuatable when the reels of the slot machine stop on certain predetermined indicia. A preferred embodiment further comprises a payout multiplier which displays a plurality of values by which a payout may be multiplied.

42 Claims, 4 Drawing Sheets

U.S. PATENT DOCUMENTS

| | | | |
|---|---|---|---|
| 4,669,731 A | 6/1987 | Clarke | 273/143 R |
| 4,700,948 A | 10/1987 | Okada | 273/143 R |
| 4,711,451 A | 12/1987 | Pajak et al. | 273/143 R |
| 4,732,386 A | 3/1988 | Rayfiel | 273/142 H |
| 4,756,531 A | 7/1988 | DiRe et al. | 273/138 A |
| 4,858,932 A | 8/1989 | Keane | 463/21 |
| 4,871,171 A | 10/1989 | Rivero | 273/138 A |
| 4,906,005 A | 3/1990 | Manabe | 273/142 R |
| 4,991,848 A | 2/1991 | Greenwood et al. | 273/143 R |
| 5,042,810 A | 8/1991 | Williams | 273/142 |
| 5,050,881 A | 9/1991 | Nagao | 273/143 R |
| 5,067,712 A | 11/1991 | Georgilas | 273/143 R |
| 5,096,196 A | 3/1992 | Gutknecht et al. | 273/142 HA |
| 5,102,134 A | 4/1992 | Smyth | 273/138 A |
| 5,102,135 A | 4/1992 | Addiechi | 273/142 E |
| 5,106,091 A | 4/1992 | Comito | 273/142 H |
| 5,152,529 A | 10/1992 | Okada | 273/143 R |
| 5,154,421 A | 10/1992 | Hamano | 273/143 R |
| 5,167,413 A | 12/1992 | Fulton | 273/85 CP |
| 5,184,821 A | 2/1993 | Korenek | 273/138 A |
| 5,188,363 A | 2/1993 | Marnell, II et al. | 273/85 CP |
| 5,205,555 A | 4/1993 | Hamano | 273/143 R |
| 5,209,479 A | 5/1993 | Nagao et al. | 273/143 R |
| 5,219,167 A | 6/1993 | Hamano | 273/143 R |
| 5,259,616 A | 11/1993 | Bergmann | 273/138 A |
| 5,292,127 A | 3/1994 | Kelly et al. | 273/138 R |
| 5,342,049 A | 8/1994 | Wichinsky et al. | 273/119 R |
| 5,344,145 A | 9/1994 | Chadwick et al. | 273/138 A |
| 5,362,052 A | 11/1994 | Kubatsch | 273/145 R |
| 5,380,008 A | 1/1995 | Mathis et al. | 273/143 R |
| 5,393,057 A | 2/1995 | Marnell, II | 273/85 |
| 5,393,061 A | 2/1995 | Manship et al. | 273/143 R |
| 5,401,024 A | 3/1995 | Simunek | 273/138 A |
| 5,411,271 A | 5/1995 | Mirando | 273/434 |

FOREIGN PATENT DOCUMENTS

| | | | |
|---|---|---|---|
| DE | 33 34 474 A1 | 4/1984 | |
| DE | 34 15 114 A1 | 10/1985 | |
| DE | 34 39 635 A1 | 4/1986 | |
| DE | 34 39 636 A1 | 4/1986 | |
| DE | 34 38 573 A1 | 5/1986 | |
| DE | 34 44 148 A1 | 6/1986 | |
| DE | 29 38 307 C3 | 7/1987 | |
| DE | 36 01 631 A1 | 7/1987 | |
| DE | 37 03 548 A1 | 3/1988 | |
| DE | 36 38 099 A1 | 5/1988 | |
| DE | 37 01 622 A1 | 8/1988 | |
| DE | 30 44 243 C2 | 3/1989 | |
| DE | 38 22 636 A1 | 1/1990 | |
| DE | 38 25 183 A1 | 2/1990 | |
| DE | 38 30 648 A1 | 3/1990 | |
| DE | 38 31 740 A1 | 3/1990 | |
| DE | 39 15 655 A1 | 11/1990 | |
| DE | 40 36 728 A1 | 5/1992 | |
| DE | 33 47 508 C2 | 3/1993 | |
| DE | 41 28 633 A1 | 3/1993 | |
| DE | 37 26 495 C2 | 4/1993 | |
| DE | 41 33 273 A1 | 4/1993 | |
| DE | 34 36 783 C2 | 7/1993 | |
| DE | 41 43 128 A1 | 7/1993 | |
| DE | 42 01 534 A1 | 7/1993 | |
| DE | 42 11 438 A1 | 10/1993 | |
| DE | 42 11 440 A1 | 10/1993 | |
| DE | 42 11 443 A1 | 10/1993 | |
| DE | 43 31 257 A1 | 11/1993 | |
| DE | 42 20 132 A1 | 12/1993 | |
| DE | 42 26 091 A1 | 2/1994 | |
| DE | 42 26 874 A1 | 2/1994 | |
| DE | 42 31 086 A1 | 3/1994 | |
| DE | 42 32 762 A1 | 3/1994 | |
| DE | 42 38 896 A1 | 5/1994 | |
| DE | 43 01 855 A1 | 7/1994 | |
| EP | 0 219 305 A2 | 10/1986 | |
| EP | 0 281 402 A2 | 3/1988 | |
| EP | 0 338 743 | 10/1989 | |
| ES | 529535 | 6/1983 | |
| ES | 529536 | 6/1983 | |
| ES | 2006400 | 4/1989 | |
| ES | 2006401 | 4/1989 | |
| ES | 2018982 | 12/1989 | |
| ES | 2013885 | 6/1990 | |
| ES | 2016168 | 10/1990 | |
| ES | 2047436 | 2/1994 | |
| ES | 2047437 | 2/1994 | |
| FR | 1 474 617 | 2/1967 | |
| GB | 1242298 | 8/1971 | |
| GB | 1428157 | 3/1976 | |
| GB | 1444085 | 7/1976 | |
| GB | 1476848 | 6/1977 | |
| GB | 2066991 | 7/1981 | |
| GB | 2072395 | 9/1981 | |
| GB | 2083936 | 3/1982 | |
| GB | 2084371 | 4/1982 | |
| GB | 2086632 | 5/1982 | |
| GB | 2096376 | 10/1982 | |
| GB | 2098779 | 11/1982 | |
| GB | 2101380 | 1/1983 | |
| GB | 2105891 | 3/1983 | |
| GB | 2106685 | 4/1983 | |
| GB | 2133994 | 8/1984 | |
| GB | 2137392 | 10/1984 | |
| GB | 2152262 | 7/1985 | |
| GB | 2153572 | 8/1985 | |
| GB | 2169737 | 7/1986 | |
| GB | 2170636 | 8/1986 | |
| GB | 2170937 | 8/1986 | |
| GB | 2170938 | 8/1986 | |
| GB | 2180682 | 4/1987 | |
| GB | 2181589 | 4/1987 | |
| GB | 2182186 | 5/1987 | |
| GB | 2191030 | 12/1987 | |
| GB | 2 193 025 | 1/1988 | |
| GB | 2197974 | 6/1988 | |
| GB | 2201821 | * 9/1988 | 273/143 R |
| GB | 2202984 | 10/1988 | |
| GB | 2 204 436 A | 11/1988 | |
| GB | 2216322 | 4/1989 | |
| GB | 2210191 | 6/1989 | |
| GB | 2218558 | 11/1989 | |
| GB | 2222712 | 3/1990 | |
| GB | 2230373 | 10/1990 | |
| GB | 2242300 | 9/1991 | |
| GB | 2262642 | 6/1993 | |
| GB | 2273384 | 6/1994 | |
| JP | 59-193487 | 12/1984 | |
| JP | 62-253091 | 11/1987 | |
| JP | 5-131044 | 5/1993 | |
| JP | 5-131045 | 5/1993 | |
| JP | 5-131046 | 5/1993 | |
| JP | 5-285252 | 11/1993 | |
| JP | 6-2177 | 1/1994 | |
| JP | 6-7498 | 1/1994 | |
| JP | 6-190114 | 7/1994 | |
| JP | 6-254208 | 9/1994 | |

OTHER PUBLICATIONS

Geddes, Robert N., "Slot Machines on Parade," First Edition, Mead Publishing Company, Oct. 1980, cover and p. ii, 1–18, 20, 22–28, 30–31, 39, 41–49, 132, 135, 142–143 and 146.

Topsy Turvy (IGT): Front page of IGT Slot Line magazine, Jul./Aug. 1990, and enlarged image of Topy Turvy machine.
Declaration of John F. Acres dated Aug. 11, 1999 filed in Civil Action No. CV–S–99–00245 and marked Exhibit D, pp. 1, 3–6 and 19, describing 1992 Bally Bonus Sevy apparatus.
Supplemental Declaration of John F. Acres dated May 6, 2000 filed in Civil Action No. CV–S–99–00245 and marked as Exhibit C, pp. 1–4, describing 1992 Bally Bonus Sevy apparatus.
Page 253 of transcript of deposition of John F. Acres on Nov. 11, 1999 describing 1992 Bally Bonus Sevy apparatus.
Court document #1: "Complaint for Patent Infringement, Breach of Covenant Not to Compete and Breach of Implied and Express Warranties".
Court document #38: "First Amended Answer and Counterclaims of Acres Gaming, Inc.".
Court document #62: "Acres' Opposition to Plaintiffs' Motion for a Preliminary Injunction".
Court document #176: "Plaintiffs' Motion for Leave to Supplement the Record regarding Plaintiffs' Motion for Summary Judgment on Defendant's Counterclaims for Correction of Inventorship".
Court document #178: "Transcript of Proceedings of Plaintiff's Motion on Defendant's Affirmative Defense of Inequitable Conduct and Plaintiff's Motion for Summary Judgment for Correction of Inventorship".
Pages 49–72 and 169–184 of transcript of deposition of William Adams taken Jun. 10, 1999 and Adams Deposition Exhibits 14–17 (the exhibits are the best quality copies available).
Pages 41–44 of transcript of deposition of Michael Mitchell taken Oct. 22, 1999.
Pages 1 and 118–121 of transcript of deposition of Mark Hettinger taken Nov. 3, 1999.
Pages 1–5, 62–125 and 278–281 of transcript of deposition of Steve Hyman taken Nov. 12, 1999 and Hyman Deposition Exhibits 6 and 22 (the exhibits are the quality copies available).
Complaint for Declaratory Judgment of Patent Noninfringement and Patent Invalidity dated Oct. 31, 2002 in Civil Action No. 02–1448.
"Defendants' Notice of Removal of Civil Action to Federal Court Pursuant to 28 USC §§ 1331, 1338, 1441, et. seq.," Civil Action No. 99–698 and copy of complaint and complaint exhibits for Case No. 99–10125.
Opposition of Australian Appl. No. 733599: 8–page document entitled "The Claims Defining The Invention Are As Follows" (Australian claims 1–41).
Opposition of Australian Appl. No. 733599: 7–page document entitled "Statement of Grounds and Particulars Relating To Each Ground".
Opposition of Australian Appl. No. 733599: "Statutory Declaration of Robert John Poynter," pp. 1–7, and Annexes RJB–1 through RJB–11.
Opposition of Australian Appl. No. 733599: "Statutory Declaration of Ante Milic," pp. 1–9, and Annexes AM–1 through AM–14.
Opposition of Australian Appl. No. 733599: "Statutory Declaration of Philip Clive Crouch," pp. 1–13, and Annex PCC–2.
Opposition of Australian Appl. No. 58011/01: Claims being opposed.

Spanish Official Bulletin of Industrial Property, 1986, p. 6610, ANCHOR 18077, with English translation of abstract 193.376.
Spanish Official Bulletin of Industrial Property, Apr. 1, 1988, pp. 1491–1492, ANCHOR 18070–18071, with English translation of abstract 1000994 and 1000995.
Spanish Official Bulletin of Industrial Property, May 1, 1988, pp. 1977, ANCHOR 18069, with English translation of abstract 1001364.
Spanish Official Bulletin of Industrial Property, Mar. 1, 1989, pp. 1555–1556, ANCHOR 18061–18062, with English translation of abstract 1007715.
Spanish Official Bulletin of Industrial Property, Apr. 16, 1989, pp. 2610–2611, ANCHOR 18088–18089, with English translations of abstracts 1008483, 1008484.
Spanish Official Bulletin of Industrial Property, Feb. 16, 1994, p. 1089, ANCHOR 18085, with English translation of abstract 1025847.
Air Link (Omega): Document dated Aug. 30, 1980 showing Air Link machine, ANCHOR 15587.
Big 50 (Maygay): Document dated 1978 referring to "Big 50," ANCHOR 15709.
Bonus (Mills): Bueschel, Richard M., "Slots" p. 142, published in 1978.
Cabaret (Barcrest): Documents describing 1982 Cabaret game, 2 pages, ANCHOR 15649–15650.
Cash Drop (Gowerpoint): Coin Slot, Dec. 1979, p. 26, ANCHOR 15589.
Cashcade (BWB): Coin Slot, Feb. 8, 1985, p. 20, ANCHOR 15791.
Cashcade (BWB): Description of 1985 Cashcade game, ANCHOR 15790.
Casino Roulette (Maygay): EuroSlot, Oct. 1992, front page and additional page, ACRES 013923 and 013925.
Chase the Lady (BWB): Coin Slot, Nov. 4, 1988, p. 6, ANCHOR 15728.
Climax (Bell Fruit Manufacturing): Document showing 1982 Climax game, ANCHOR 15565.
Club Casino (Newby): 1990 document showing Club Casino game, ANCHOR 15576.
Club Monte Carlo (Bell–Fruit Manufacturing): Coin Slot, Jun. 22, 1984, p. 11, ANCHOR 15718.
Crusader (MDM Leisure): Coin Slot, Nov. 9, 1984, p. 6, ANCHOR 15586.
Dial (Mills): Bueschel, Richard M., "An Illustrated Guide to the 100 Most Collectible Trade Simulators," p. 83 (1978).
Eliminator (Maygay): Documents describing 1988 Eliminator game, 2 pages, ANCHOR 15653–15654.
Extra Line (JPM): EuroSlot, Sep. 1994, front page and additional page, ACRES 013907, 013909.
Faircst Wheel: Marshall Fey, "Slot Machines," p. 150 (1983).
Fortune Wheel (Project Coin): Coin Slot, Feb. 14, 1992, 1 page, ACRES 13949.
Fortune Wheel (Project Coin): Coin Slot, Apr. 10, 1992, 1 page, ACRES 13952.
Fortune Wheel (Project Coin): Jul. 27, 2000 letter from Michael Broaddus to Steven Daniels regarding 1992 Fortune Wheel game.
Fortune Wheel (Project Coin): JPEG images of 1992 Fortune Wheel game enclosed with Jul. 27, 2000 letter, 6 pages, Mvc–109s, Mvc–110s, Mvc–116s, Mvc–120s, Mvc–121s, Mvc–160s.

Fortune Wheel (Project Coin): 2–page facsimile dated Aug. 23, 2000 from Richard Booth to Mike Broaddus regarding 1993 Fortune Wheel game, ACRES 14006–14007, 1–page "Sales Invoice No. 9312007" for Fortune Wheel game, ACRES 013988, 1–page "Acknowledgement of Order," ACRES 013989, and 1–page "Advice/Dispatch Note," ACRES 013990.

Fortune Wheel (Project Coin): Document entitled "Fortune Wheel—Instructions for Conversion" for 1993 Fortune Wheel game, ACRES 14008–14022.

Futurity (Mills): Geddes, Robert M., "Slot Machines on Parade," p. 128, published Oct. 1980.

Futurity (Mills): Bueschel, Richard M., "Slots 1," p. 136, published in 1978.

Golden Shot (Subelectro): Coin Slot, Jan. 25, 1985, p. 20, ANCHOR 15720.

Grand Royal (Jac van Ham): EuroSlot, Mar. 1994, front page and additional page, ACRES 013894 and 013897.

Jokers Wild (JPM): EuroSlot, Jun. 1992, front page and additional page, ACRES 013916 and 013918.

Lords and Jokers (Maygay): EuroSlot, Mar. 1994, front page and additional page, ACRES 013894 and 013896.

Lucky Dip (Maygay): Documents describing 1984 Lucky Dip game, 2 pages, ANCHOR 15554 & 15556.

Lucky Strike (Barcrest): Documents describing 1983 Lucky Strike game, 2 pages, ANCHOR 15655, 15656.

Money Wheel (Brenco): Coin Slot, Jan. 13, 1979, 1 page, ANCHOR 15731.

Number 1 (Bell–Fruit Manufacturing): Documents describing "Number 1" game, Nov. 1984, 3 pages, ANCHOR 15539, 15540, 15588.

Pik A Win (Maygay): Document showing "Pik A Win" game, handwritten date of Sep. 14, 1977, ANCHOR 15708.

Poundrush (JPM): Amusement Machine Guide , Jul./Aug. 1988, cover page and p. 15, 19, ANCHOR 15796, 15809, 15813.

Reflex (Bell–Fruit Manufacturing): Coin Slot, Jan. 25, 1985, p. 20, ANCHOR 15720.

Risk Disks (Bell–Fruit Manufacturing): Coin Slot, May 12, 1984, p. 24, ANCHOR 15558.

Roulette (BTR): EuroSlot, Mar. 1994, front page and additional page, ACRES 013894 and 013896.

Seven Up (Bell–Fruit Manufacturing): Document describing "Seven Up" game, documents refers to date of May 1987, ANCHOR 15553.

Seven Up (Bell–Fruit Manufacturing): Document showing 1987 "Seven Up" game, ANCHOR 15555.

Seven Up (Bell–Fruit Manufacturing ): Coin SLot, May 8, 1987, pp. 40 and 41, ANCHOR 15732 and 15727.

Silver Gambler (Ace Coin): Document desciping "Silver Gambler" game, document refers to date of Jul. 1977, ANCHOR 15542.

Silver Gambler (Ace Coin): Coin Slot, Apr. 23, 1977, p. 15, ANCHOR 15593.

Silver Machine (Ace Coin): Documents describing "Silver Machine" game, Nov. 1981, 3 pages, ANCHOR 15548, 15549, 15595.

Space Fruits (Omega): Coin Slot, Oct. 27, 1979, 1 page, ANCHOR 15730.

Spin –A– Win (Bell–Fruit Manufacturing): Document dated Aug. 30, 1980 showing Spin –A– Win machine, ANCHOR 15587.

Spin To Win (Associated Leisure): EuroSlot, Nov. 1993, front page and additional page, ACRES 013887 and 013889.

Stop A Shot (Associated Leisure): Coin Slot, Jan. 1985, ANCHOR 15719.

Super Roulette (Mitronics): Coin Slot, Jan. 24, 1986, p. 40, ANCHOR 15726.

Super Series (Barcrest): Documents describing 1981 Super Series game, 2 page, ANCHOR 15657, 15658.

Super Shot (Associated Leisure): Coin Slot, Jan. 1985, ANCHOR 15719.

Super Swap (Oper Coin): Coin Slot, Jan. 1990, 1 page, ANCHOR 15583.

Super Star (Barcrest): Document showing Super Star game, Feb. 10, 1979, ANCHOR 15581.

Target (Aristocrat): Coin Slot, Jan. 26, 1980, p. 58 (bottom right), ACNHOR 15578.

Ten/Twenty (Ace Coin): Documents describing 1985 "Ten/Twenty" game, 3 pages, ANCHOR 15694, 15695, 15733.

Trispin (Oper Coin): Coin Slot, Jan. 1990, 1 page, ANCHOR 15583.

Twist 'n Shout (Project Coin): Documents describing "Twist 'n Shout" game, Oct. 16, 1992, 3 pages, ANCHOR 15643–15644 & ACRES 013956.

Victor (Drobush): Bueschel, Richard M., "An Illustrated Guide to the 100 Most Collectible Trade Simulators," p. 29 (1978).

Videomat: EuroSlot, Jan. 1993, front page and additional pages, ACRES 013926, 013928 and 013929.

Wheel n' Deal (Summit Coin): Page from Coin Slot, Jan. 16, 1982 showing "Wheel 'n Deal" game and enlargement, 2 pages, ANCHOR 15592, 15538.

Wheel of Fortune (Barcrest): Catalog of Barcrest Casino Technologies, 6 pages: ANCHOR 15597–15599, 15602, 15617, 15619; page ANCHOR 15602, states "Price list per Jun. 1996"; p. ANCHOR 15617 has 1995 date.

Wheel of Fortune (Barcrest): Document showing "Wheel of Fortune" game ANCHOR 15758.

Wheel of Fortune (Barcrest): 15–page document describing "Wheel of Fortune" game, dated Dec. 16, 1991, ANCHOR 15759–15773.

Wheel of Fortune (Barcrest,: EuroSLot, Aug. 1994, front page and additional page, ACRES 013904 and 013906.

Wheel of Fortune (Barcrest): 2–page document referring to Wheel of Fortune I (1991) and Wheel of Fortune II (1995), ANCHOR 15774–15775.

Wheel of Fortune (Barcrest): EuroSlot, Nov. 1993, front page and additional page, ACRES 013887 and 013890.

Wheel of Fortune (Barcrest): Intergame Magazine, Jun. 1995, cover.

Wheel of Fortune (Bell–Fruit Manufacturing): Page from Coin Slot, Jan. 26, 1980, showing "Wheel of Fortune" game (bottom left), ANCHOR 15578.

Wheel of Fortune (Griswold): Bueschel, Richard M., "An Illustrated Guide to the 100 Most Collectible Trade Simulators," p. 21 (1978).

Wheel of Fortune (Project Coin): EuroSlot, Apr. 1994, front page and additional page, ACRES 013898 and 013900.

Wheel of Fortune (Project Coin): Coin Slot, May 22, 1992, 2 pages, ACRES 013940 and 013946.

Wheel of Fortune (Project Coin): Coin Slot, May 29, 1992, 1 page, ACRES 013936.

Wheel of Fortune (Project Coin): Jul. 13, 2000 letter from Michael Broaddus to Steven Daniels regarding 1992 Wheel of Fortune game.

Wheel of Fortune (Project Coin): JPEG images of 1992 Wheel of Fortune game enclosed with Jul. 13, 2000 letter, 6 pages, Mvc–134s, Mvc–135s, Mvc–136s, Mvc–137s, Mvc–143s, Mvc–161s.

Wheel of Fortune (Summit Coin): Page from Coin Slot, Jan. 16, 1982 showing "Wheel of Fortune" game and enlargement thereof, 2 pages, ANCHOR 15592, 15538.

Wheel of Fortune: Coin Slot, Oct. 18, 1985, p. 12, ANCHOR 15722.

Wheel of Fortune: EuroSlot, May 1992, front page and additional, ACRES 013913 and 013915.

Whirlo: Coin Slot, Feb. 14, 1986, p. 28, ANCHOR 15725.

Winspin (Associated Leisure): Document entitled "Coin Slot Archive Summary" referring to Apr. 26, 1985 article regarding Winspin, ANCHOR 15735.

Winspin (Associated Leisure): Coin Slot article referring to 1985 Winspin game, ANCHOR 15721.

Bally Circus: Document describing 1972 "Circus" game, ANCHOR 15706.

Bally Circus: Document showing 1972 "Circus" game.

Bally Double or Nothing: p. 267 from "Chapter 11—1975–1984" describing 1975 Double or Nothing game, Model 1083.

Bally Fun Fair: Document showing "Fun Fair" game, ANCHOR 15596.

Bally Golden Wheels: Document showing 1973 Golden Wheels game.

Bally Lucky Stars: Cover page of journal entitled "Loose Change" dated Sep. 1991 and showing Bally Lucky Stars game.

Bally Monte Carlo: Oct. 18, 2001 letter from Robert Kovelman to Joseph Walkowski.

Bally Monte Carlo : Document with photocopied image of upper portion of 1977 Bally Monte Carlo slot machine #1 enclosed with Oct. 18, 2001 letter.

Bally Monte Carlo: Document with photocopied image of entire 1977 Bally Monte Carlo slot machine #1 enclosed with Oct. 18, 2001 letter.

Bally Monte Carlo: 1–page sheet enclosed with Oct. 18, 2001 letter showing and describing 1977 Bally Monte Carlo game.

Bally Monte Carlo: 1–page advertisement enclosed with Oct. 18, 2001 letter showing Bally Monte Carlo game, dated 1978.

Bally Monte Carlo: 1–page document enclosed with Oct. 18, 2001 letter listing model numbers, names and release dates for various Bally games, including Model No. 1117 for Danish Monte Carlo released Jan. 5, 1977 and Model No. 1117–1 for Australian Monte Carlo released Jan. 18, 1977.

Bally Monte Carlo: 1–page document enclosed with Oct. 18, 2001 letter showing image of three 2001 Bally Monte Carlo slot machines.

Bally Monte Carlo Slot Machine #1: Oct. 19, 2001 email from Robert Kovelman to Joseph Walkowski.

Bally Monte Carlo Slot Machine #1: Document with original color image of upper portion of 1977 Bally Monte Carlo slot machine #1 enclosed with Oct. 19, 2001 email.

Bally Monte Carlo Slot Machine #1: Document with original color image of entire 1977 Bally Monte Carlo slot machine #1 enclosed with Oct. 19, 2001 email.

Bally Monte Carlo Slot Machine #1: Oct. 23, 2001 email from Robert Kovelman to Joseph Walkowski regarding 1977 Bally Monte Carlo Slot machine #1, 2 pages.

Bally Monte Carlo Slot Machine #1: Document with original color JPEG image of game tag of 1977 Bally Monte Carlo slot machine #1 (40% scaled).

Bally Monte Carlo Slot Machine #1: Document with original color JPEG image of game tag of 1977 Bally Monte Carlo slot machine #1 (49% scaled).

Bally Monte Carlo Slot Machine #2: Report entitled "Bally Manufacturing Corporation Monte Carlo Slot Machine Product Analysis Report," dated Jan. 28, 2004, pp. 1–36, with original color images, prepared by TAEUS describing 1976 Bally Monte Carlo slot machine #2.

Bally Windsor Castle: Document showing Windsor Castle game, 1968, ANCHOR 15705.

Bally: Marshall Fey, Liberty Belle Books, "The Complete Service Manual For Bally Slot Machines—Electro–Mechanicals 1964–1980," dated 1993, front cover, table of contents page, pp. 2–111, and back cover.

Bally: Manual No. 2600 of Bally Manufacturing Corporation entitled "Bally Slot Machines—Service Instructions & Parts Catalog," dated Jan. 1, 1975, cover, table of contents and pp. 1–56.

Bally: Marshall Fey, Liberty Belle Books, "Ball Slot Machines—Electro–Mechanicals 1964–1980, Revised 3$^{rd}$ Edition, front cover (outside and inside), pp. 1–75, 2–page chart entitled Bally Electro–Mechanical Slot Chart 1964–1980, 2–page chart entitled Bally Series E Slot Chart 1980–1987," additional page, and back cover (inside and outside).

Bally Bonus Sevy: Document showing 1993 Bonus Sevy game.

Amusement Machine Guide, Jul./Aug. 1988, cover, pp. 3–233 and 235–242 and 2 additional pages (p. 234 is missing), ANCHOR 15796–16037.

* cited by examiner

_US 6,827,646 B2_

SLOT MACHINE WITH AN ADDITIONAL PAYOUT INDICATOR

RELATED APPLICATION DATA

This patent is a continuation of U.S. Ser. No. 09/169,666 filed in the Patent Office on Oct. 9, 1998 now abandoned, which is a continuation of U.S. Ser. No. 08/907,764 filed in the Patent Office on Aug. 8, 1997, now U.S. Pat. No. 5,848,932, which is a continuation-in-part of U.S. Ser. No. 08/311,783 filed in the Patent Office on Sep. 23, 1994, now abandoned. All of the patent applications identified in this paragraph are incorporated by reference herein in their entirety.

BACKGROUND OF THE INVENTION

Games of chance have been enjoyed by people for years and have enjoyed widespread popularity in recent times. Many people enjoy playing a wide variety of games that they have not played before. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts.

Those familiar with games involving winning payouts, such as the popular television game show entitled "WHEEL OF FORTUNE" will realize that as players and observers watch a large wheel spin and gradually come to rest, the players experience a heightened feeling of anticipation and excitement as the wheel is slowing down to indicate a possible prize.

It would therefore also be desirable to provide a payout indicator which is discernible by a player and/or other observers.

SUMMARY OF THE INVENTION

Various embodiments of the present invention comprise methods of playing games, gaming devices and table games utilizing a primary game, e.g., rotatable reels, and at least one discernible indicia of a secondary game, preferably comprising a payout indicator. The secondary game is separate from the primary game either physically or temporally.

According to the most preferred embodiments, a bonus payout indicator is clearly visible to a player and is operable when primary reels of a primary game slot machine stop on certain predetermined indicia. According to one preferred embodiment of the present invention, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and when the wheel stops, a pointer indicates the payout to be awarded to the player.

Another preferred embodiment of the present invention further comprises a discernible multiplier which provides the ability to change either the payout from the primary gaming unit or the secondary payout indicator, or both. As described in more detail below, it is within the scope of the present invention to provide a payout from the primary gaming unit, a payout indicated by the secondary indicator only, a payout from the primary gaming unit or the secondary indicator as changed by the multiplier, or a separate, plurality of payouts from the primary gaming unit and the secondary indicator either with or without modification by a multiplier.

According to one preferred embodiment of the present invention, the mechanical bonus payout indicator is electronically operated and is linked to a random number generator which determines where the secondary indicator actually stops.

According to another preferred embodiment of the present invention, when the primary unit stop on one of a predetermined plurality of winning indicia sets, a second event actuator is placed in an active state. According to this embodiment, a person, such as the player, must actuate the actuator in order to operate the bonus indicator.

According to another embodiment of the present invention, the bonus actuator requires operator intervention so that a player must involve a casino attendant who can activate the bonus indicator.

According to another preferred embodiment of the present invention, the bonus indicator is connected to a drive mechanism which gradually reduces the rate of spin of the bonus wheel before the bonus wheel stops.

Still other embodiments of the present invention comprise gaming devices having electronic means for displaying indicia of rotatable reels such as a video screen and/or means for displaying indicia of a secondary payout indicator, such as a video screen. The present invention also comprises methods for playing a game of chance. One preferred method comprises the steps of displaying a first randomly selected combination of indicia, said displayed indicia selected from the group consisting of slot reels, indicia of at least one reel, indicia of at least one playing card, and combinations thereof; generating at least one signal corresponding to at least one select display of first indicia; providing at least one discernible indicia of a mechanical bonus indicator, said bonus indicator indicia indicating at least one of a plurality of possible payouts, wherein said bonus indicator indicia providing means is operatively connected to said first, standard gaming unit and actuatable in response to said signal. According to one preferred embodiment, the discernable indicia of a mechanical bonus indicator gradually reduces the rate of movement of the mechanical bonus indicator for some period of time prior to actually providing the discernable indicia of a payout. According to another embodiment, a multiplier is provided to multiply at least one payout by a multiple which is most preferably indicated to a player. The multiple can preferably sequentially change as discernable indicia change. For example, a plurality of multiples can be synchronized with a plurality of discernable indicia on the mechanical bonus indicator such that the multiple changes as the payout indicated changes.

Further embodiments of the present invention comprises a method of conducting a game of chance comprising the steps of providing a player with an opportunity to place a wager; displaying a randomly selected combination of indicia, said displayed indicia selected from the group consisting of reels, indicia of at least one and preferably a plurality of reels, indicia of at least one and preferably a plurality of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

DETAILED DESCRIPTION

Figure 1:
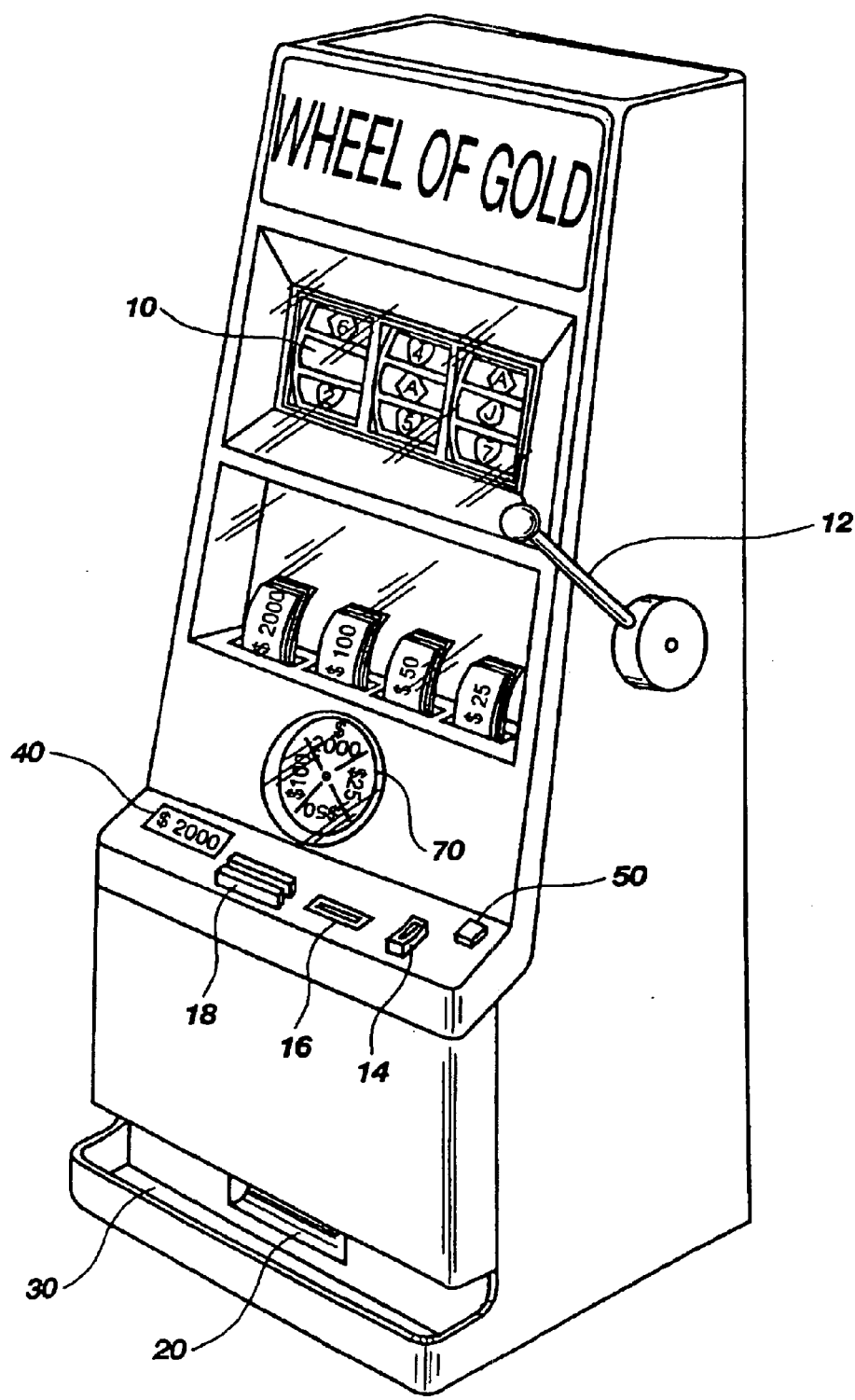
FIG. 1 is a perspective view one of a gaming device of one embodiment of the present invention.

The various embodiments of the present invention are designed to provide added excitement to a board/table game or gaming device in order to increase the enjoyment to players and to serve as an added attraction to potential players. One preferred embodiment of the present invention, illustrated in FIG. 1, comprises a primary gaming unit which comprises three rotatable reels 10, each of which comprise a plurality of indicia on the periphery thereof. The illustrated gaming device comprises a mechanical lever 12, coin slot 14, currency validator 16 and a credit card validator 18. In a manner which will be recognized by those skilled in the art, each reel 10 is designed to rotate and then stop in order to visually display at least one, and preferably a number of indicia. If the collection of indicia displayed by the three reels is one of a predetermined plurality of winning indicia sets, then the player can typically be provided with a winning payout either through coin chute 20 which deposits winnings into a coin trough 30 or by increasing the player's credits in a credit window 40.

Figure 2:
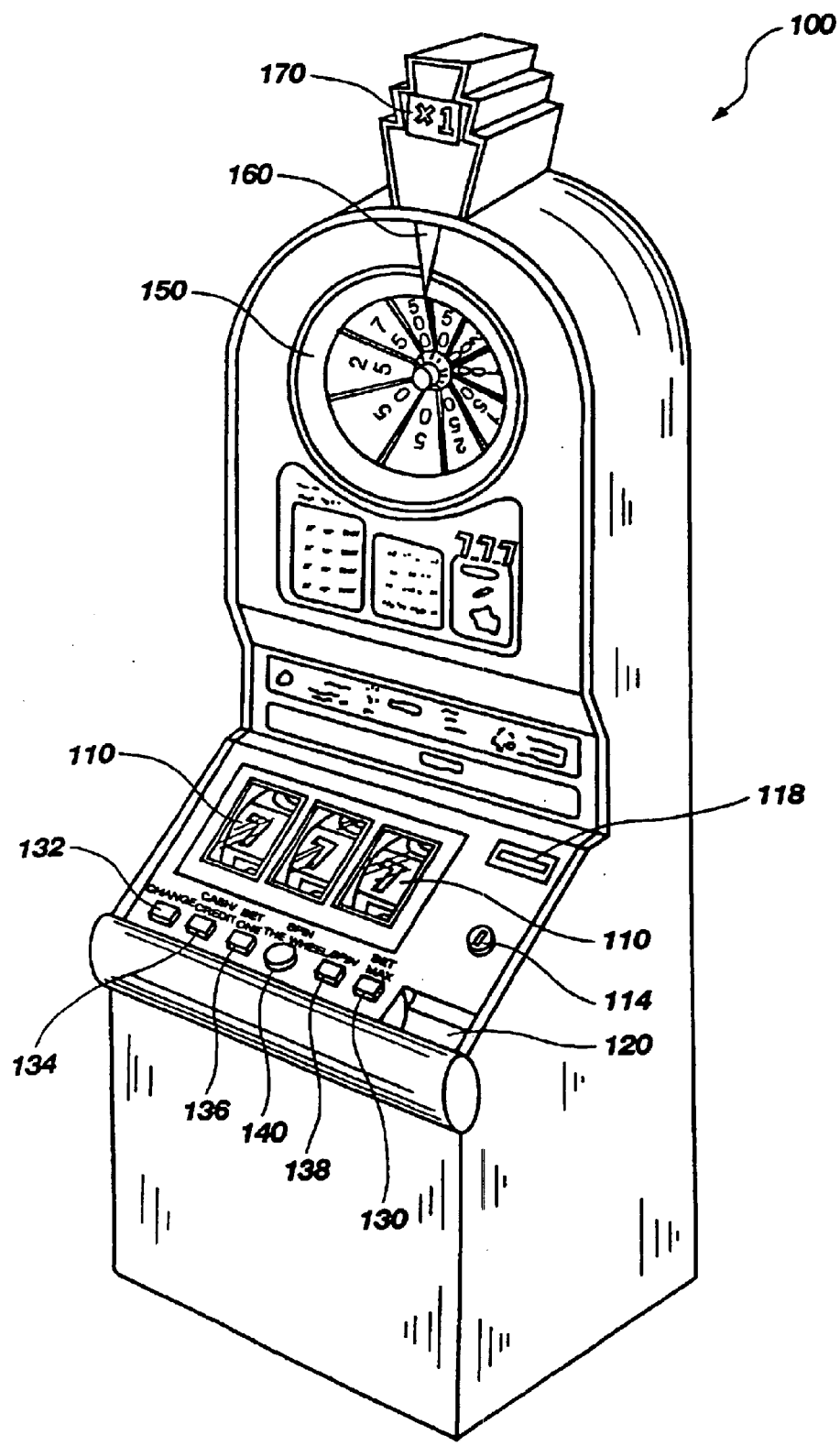
FIG. 2 is another embodiment of a gaming device of the present invention.

According to one aspect of the present invention, when the reels 10 display at least one of a plurality of predetermined winning indicia or indicia sets then the player is provided with an opportunity for a secondary payout. According to this illustrated embodiment of the present invention, a bonus actuator button 50 is placed in an operative state when reels 10 display a bonus indicia set. A player must then depress bonus actuator 50 in order to start bonus indicator 70 spinning. In the illustrated embodiment, bonus indicator 70 is in the form of a rotatable wheel. The wheel may be a carnival-type wheel comprising pegs and a clapper or could take one or more other forms, such as a fanciful wheel typically used in a roulette game as shown in the embodiment of FIG. 2. If a preferred motor driven wheel is utilized, it is preferably linked to some random value generator in order to randomly determine where the wheel will actually stop. In order to enhance the playing experience, sound effects corresponding to a clapper slapping against pegs of a carnival wheel are preferably provided as the wheel passes from one segment to another. The bonus indicator 70 is also preferably controlled so that the rate of spin is reduced, most preferably gradually reduced, prior to stopping in order to simulate a mechanical spinning wheel.

The facing surface of bonus indicator 70 of FIG. 1 comprises four distinct areas bearing indicia of the bonus payout to the player. In the illustrated embodiment, the bonus indicator has areas indicating bonuses of $25.00, $50.00, $100.00, and $2,000.00. When bonus indicator 70 stops, an indicator (not shown) will indicate the area on the bonus wheel corresponding to the amounts of the bonus to be provided to the player.

In a manner which will be appreciated by those skilled in the art, bonus indicator 70 can be operatively linked to a "payout" mechanism which provides a bonus payout to a player through currency chute 20 or by increasing the amount of winnings shown in credit window 40. As stated above, the payout of the bonus indicator can be in addition to a standard payout by the primary gaming unit or can be in place of the payout normally associated with the primary gaming unit.

Those familiar with gaming and game shows, will appreciate that players and observers typically experience a heightened level of anticipation and excitement as they observe one or more moving objects approaching a winning position. It is therefore most preferred for the bonus indicator of the present invention to be readily discernible, e.g., clearly visible and/or audible to the player.

According to another preferred embodiment of the present invention, a bonus indicator is connected to a electronic control unit, for example a motor, which gradually decreases the rate of movement of the bonus indicator before the bonus indicator stops. According to this embodiment of the present invention, players can be provided with a realistic sense of a totally mechanical indicator. Those skilled in the art will appreciate that such a control unit can also readily be connected to a random generator which will randomly select the winning payout according to a predetermined frequency of occurrence for each individual bonus payout, and then cause the bonus indicator to stop at the desired area. Those skilled in the art will also appreciate that other mechanisms can be utilized for gradually decreasing the rate of movement of the secondary payout indicator, e.g., a controlled braking system.

According to another embodiment of the present invention, when reels 10 display an indicia set which will provide a bonus, the bonus indicator becomes activatable but requires intervention by a house attendant, such as a casino attendant, in order to actuate the bonus indicator. According to this embodiment of the present invention, the casino is provided with greater control over the actuation of the bonus indicator and, if desired, can accompany the actuation of the bonus indicator with great fanfare. It will be appreciated that the amounts of the bonus indicated in the figures are merely for purposes of illustration and, if desired, one of the amounts on the bonus indicator can have a significantly greater value. For example, one of the areas on the bonus indicator may correspond to a new automobile, a luxury vacation or a very large sum of money.

While the illustrated embodiment of the present invention in FIG. 1 is generally in the form of a rotatable wheel, other visible, mechanical indicia can be provided, whether controlled totally mechanically, electro-mechanically, or electronically without departing from the scope of the present invention.

As shown in FIG. 1, in order to provide additional levels of excitement, indicia of the possible bonuses are preferably visibly displayed within the slot machine. For example, in one illustrated embodiment, a shelf is preferably displayed comprising piles of currency equal to the amounts on the bonus indicator. While actual cash is preferred, the slot machine may also be provided with fake currency or simply indicia of actual currency or the other bonus prizes.

A preferred embodiment of the present invention is illustrated in FIG. 2 wherein a gaming device 100 comprises a primary gaming unit in the form a standard three-reel slot machine which displays reels 110. Suitable controls and currency mechanisms including a coin slot 114, bill validator 118, payout shoot 120 are provided. Furthermore, suitable player controls including CHANGE button 132, CASH/CREDIT button 134, BET ONE button 136, SPIN button 138 and BET MAX button 130 are also provided.

In addition to these standard controls the control panel of this preferred illustrated embodiment of the present invention comprises a SPIN THE WHEEL button 140 which becomes actuatable when the primary gaming unit, as indicated by reels 110, has randomly selected one of a plurality of predetermined indicia sets. While the primary gaming unit shown in the lower portion of the cabinet of gaming device 100 will typically have the ability to provide a plurality of winning payouts, the SPIN THE WHEEL button 140 can become actuatable when the stopped reels 110 indicate some subset of the primary unit's winning indicia, when any one of the winning reel indicia are displayed, or further in response to one or more other predetermined indicia, or a combination thereof. For example, the SPIN THE WHEEL feature, or some other secondary game, can be actuated or become activatable in response to a single indicia indicated on one of the reels or reel indicia.

When the SPIN THE WHEEL button 140 is actuated by a player, bonus wheel 150 is caused to rotate and randomly select and display one of a plurality of different areas. According to the preferred illustrated embodiment, all of the bonus areas indicate an increased winning value for the player. However, it is within the scope of the present invention to provide non-monetary prizes or losing spaces wherein no additional prize is provided and/or wherein the prize normally associated with the indicia shown on the primary gaming unit reels 110 is reduced. In the illustrated embodiment, a pointer 160 advantageously indicates the result of the bonus indicator 150.

In addition to the bonus wheel 150, this preferred illustrated embodiment of the present invention also comprises a bonus multiplier 170. The multiplier 170 preferably randomly selects a value by which the bonus indicated by bonus wheel 150 is multiplied. For example, the bonus indicator 170 can have an LED screen which cycles through multipliers of "times one", "times two" and "times three" which will indicate that the bonus is as indicated, doubled, or tripled, respectively. The multiplier 170 can be programmed to select a multiplier either totally randomly or according to some other predetermined frequency of occurrence wherein certain multipliers will occur more frequently than other multipliers. While this illustrated embodiment comprises whole number multipliers, it is also within the scope of the present invention to utilize values other than whole numbers or to include multipliers which will result in a decrease in the value shown by the bonus indicator 150. For example, a multiplier sequence could include a "times zero" value. When bonus wheel indicator 150 is not in use, the multiplier LED window can be set to an attract mode wherein a message is displayed to players or potential players. For example, the LED display could show a message, either in complete form or can be set to sequentially display either words or individual letters, such as "SPIN-THE-WHEEL".

According to the various embodiments of the present invention, the bonus multiplier or additional payout multiplier is most preferably synchronized with the movement of the rotatable wheel or indicia of a rotatable reel, such that the multiplier value will change as each wheel segment passes the indicator. The most preferred embodiments of the present invention additionally comprise audible signals, such as the clicking of a clapper of the type found on actual spinning wheel comprising a clapper indicator and pegs which strike the clapper. The audible signals are preferably also synchronized with the segments of the wheel such that an audible signal is provided as the wheel moves from one segment to another. This advantageously provides the effect of a mechanical wheel comprising pegs moving past a mechanical clapper.

Figure 3:
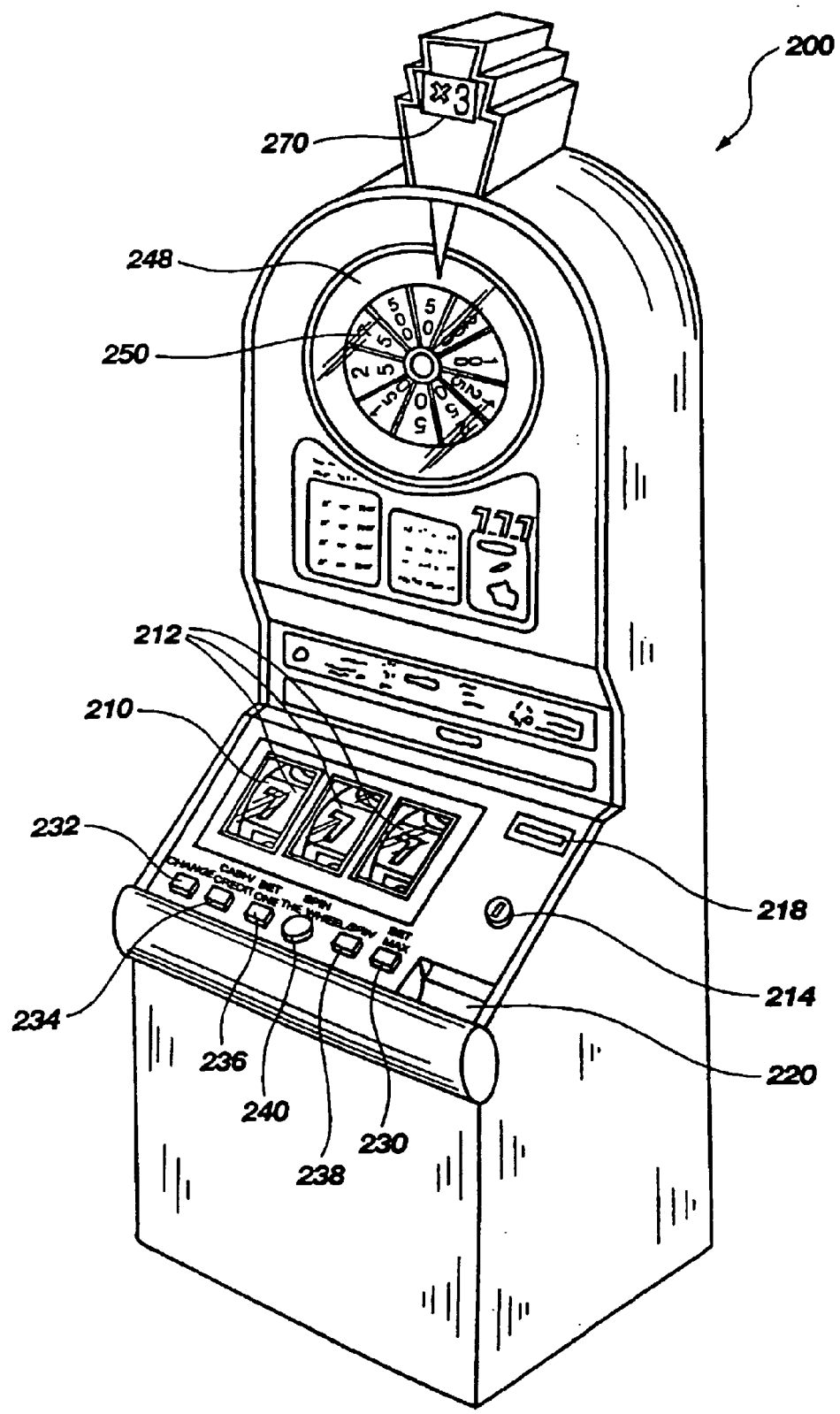
FIG. 3 illustrates an alternative embodiment of the present invention.

FIG. 3 illustrates a less preferred embodiment of the present invention wherein a gaming device 200 comprising similar controls as the controls illustrated in the embodiment of FIG. 3. In this illustrated embodiment, and wherein a bonus indicator 250 is in the form of an electronically generated image, such as a video screen or an LED display and provides discernible indicia, e.g., a visual video display, of a bonus wheel. For example, the video display can show a wheel of the type used in a roulette game such as the wheel 150 illustrated in FIG. 2.

The slot machine shown in FIG. 3 comprises a video display 210, such as a video screen, which displays three reels 110, each of which comprise a plurality of indicia. In addition, this slot machine comprises a video display 250, such as a second video screen, for displaying a bonus payout indicator. While separate screens are preferred, both the reels and the bonus payout indicator could be displayed on the same video screen. According to this embodiment of the present invention, the bonus payout indicator displays indicia of a wheel or a reel.

In a manner known in the art, the gaming device comprises a coin slot 214, a currency validator 218, and a coin chute 220. After placing a wager, a player determines the amount of his wager by either pressing the BET ONE button 236 or the BET MAX button 230. After the player has selected the amount of his wager, he depresses the SPIN button 238 which "spins" the reels shown in video display window 210.

Each indicia of a displayed reel 210 is designed to indicate rotation and then stop in order to visually display at least one, and preferably a number of indicia. When reels 210 display a particular indicia set or one of a predetermined plurality of indicia sets, then the additional payout mode is activated and video display 250 displaying payout indicator is placed in an operable state. In this illustrated embodiment, the displayed payout indicator 250 displays an indicia of a rotating wheel comprising a plurality of distinct areas bearing indicia of payouts to the player. Payout indicator 250, is caused to selectively indicate one of the plurality of indicia, either automatically, upon intervention of a casino or house attendant, or upon a player depressing SPIN THE WHEEL button 240 in order to start indicator 250 spinning. It will be appreciated that the amounts of the payout indicated in FIG.

2 are merely for purposes of illustration and, if desired, one of the amounts on the bonus indicator can have a greater value, e.g., a new automobile, a luxury vacation or large sum of money which may be collected subsequently, or lesser values, e.g., no payout.

The displayed reels 210 and displayed bonus indicator 250 can be operably controlled by suitable controls to gradually slow down as they come to a complete stop, displaying a selected reel indicia and a bonus indicia, respectively.

The embodiment of the present invention illustrated in FIG. 2 is considered most preferable since it is believed that players prefer to see actual slot reels and an actual bonus wheel spinning in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown for example on a video screen. It is also possible to replace the wheel with some other discernible indicia of a mechanical bonus indicator which is operatively connected to the first standard gaming unit and which either automatically commences or is actuatable in response to the result provided by the standard gaming unit. According to the present invention, both of the standard gaming unit and bonus indicator are controlled to provide random results.

From the foregoing description, it will be appreciated that embodiments of the present invention, which are specifically directed to gaming and gaming devices, comprise three different indicators. The most preferred embodiments comprise a primary (standard) gaming unit, an additional payout indicator, preferably in the form of a wheel, and a payout multiplier. While the illustrated payout multiplier of the illustrated embodiments is in the form of an electronically selected value, it is also within the scope of the present invention to have a multiplier which involves some skill on the part of a player. For example, according to an additional preferred embodiment of the present invention, a player will shoot actual projectiles, such as coins, at one or more targets in an effort to increase the value of the multiplier. In any of the embodiments of the present invention utilizing a multiplier, the multiplier can affect the value of a payout from the standard gaming unit, the additional payout indicator, or both the standard gaming unit and the payout indicator.

As stated above, the present invention also includes methods of conducting a wagering game of chance comprising the steps of providing a player with an opportunity to place a wager; displaying a randomly selected combination of indicia, said displayed indicia selected from the group consisting of reels, indicia of reels, indicia of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal. A further preferred method comprises the step of displaying at least one value by which a payout may be multiplied.

Another method of the present invention comprises the steps of requiring at least one player to make a wager; displaying at least one randomly selected playing card from a predetermined card indicia set; displaying and rotating a rotatable wheel comprising a plurality of indicia corresponding to a plurality of prizes if said displayed playing card indicia was one of a preselected plurality of winning card indicia; and determining a winning payout with said wheel, wherein said winning payout is randomly selected.

Figure 4:
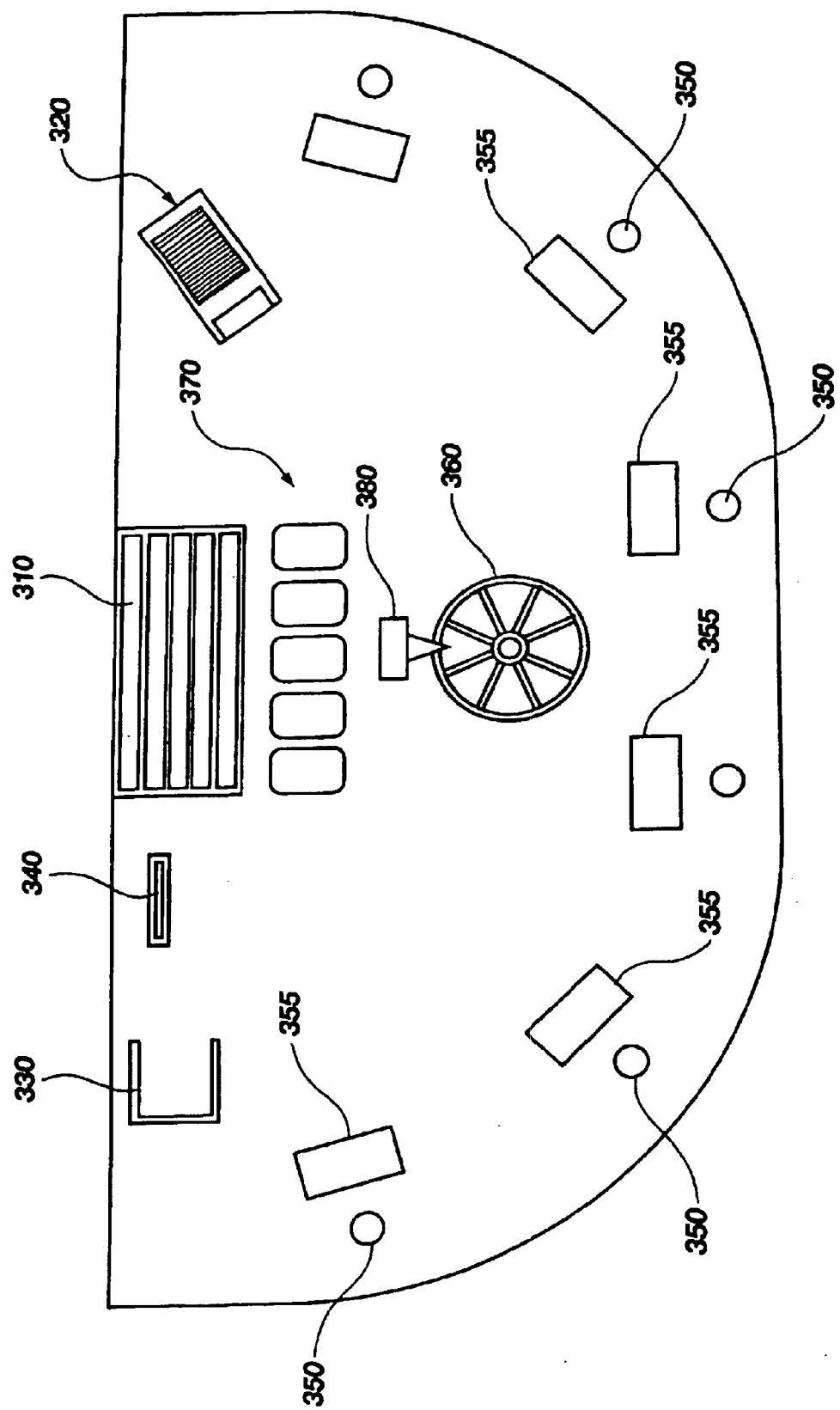
FIG. 4 is an alternative embodiment of the present invention in the form of a table game.

Another embodiment of the present invention in the form of a table game is illustrated in FIG. 4 wherein a chip rack 310, card shoe 320, discard shoe 330, wager slot 340, betting areas 350, and secondary event wheel 360 are provided. According to this embodiment of the present invention after one or more players have placed wagers in wagering areas 350, a dealer will provide cards to the wagering players in areas 355 and then provide cards to himself in card area 370. After the cards have been dealt, the initial bets can be resolved by comparing the players' cards to the dealer's cards. While the illustrated game is shown as five card stud poker, other games and arrangements can also be utilized without departing from the scope of the present invention. For example, a player's cards can be compared to other player's cards or a predetermined payout schedule, or other card games can be utilized including seven card draw, five card draw poker, black jack, etc.

Upon the happening of a predetermined occurrence, such as the receipt of one of a preselected plurality of card hands, one or more of the players can be given the opportunity to spin the payout indicator 360, which is most preferably electronically operated by an actuation switch. The actuation switch can be within reach of the players for added excitement or can be actuated by the dealer. Alternatively, actuation by a player's actuator switch can require prior actuation of a dealer switch which will then render the player's switch operable. If less than all of the players are going to benefit from the results of payout indicator 360, additional indicators can be positioned proximate the players in order to indicate which players are involved in the spin of payout indicator 360. In a manner similar to that shown in FIG. 2, a payout multiplier 380 is also provided. Sound effects as referenced above and means for gradually decreasing the rate of movement of the payout indicator 360 are also preferably provided.

In addition to the primary gaming unit or primary game, the secondary event, and the multiplier, another preferred aspect of the present invention which can be utilized with all previously described embodiments comprises a DOUBLE-OR-NOTHING feature wherein winning players may wager their winnings in a double-or-nothing fashion. According to this feature of the present invention, a player may be provided with the opportunity to bet on red or black after he has won a game. For this purpose, the rotatable wheels of the present invention are preferably provided with alternating red and black pie-shaped segments. According to this feature, a player can be provided with the opportunity of betting on red or black with the opportunity of doubling his winnings if he makes a correct selection. After the player makes his selection, the wheel would be rotated to determine whether the player has successfully doubled his winnings or has lost those winnings. A player may be provided with the opportunity of utilizing the double or nothing feature several times and/or up to a certain maximum to be determined by the game operator.

What is claimed is:

1. A slot machine, comprising:

a value-input device;

a first slot machine reel having a plurality of first reel symbols disposed thereon;

a second slot machine reel having a plurality of second reel symbols disposed thereon;

a third slot machine reel having a plurality of third reel symbols disposed thereon;

a movable mechanical payout indicator comprising a rotatable wheel payout indicator having a face, said rotatable wheel payout indicator being rotatable about an axis that passes through said rotatable wheel payout indicator, one of said first, second and third slot machine reels being rotatable about an axis that is not parallel to said axis about which said rotatable wheel payout indicator is rotatable;

a plurality of circumferentially arranged payout areas comprising a first payout area, a second payout area, and a third payout area, said circumferentially arranged payout areas being disposed on said face of said rotatable wheel payout indicator around said axis about which said rotatable wheel payout indicator is rotatable;

a plurality of payout amount symbols disposed on said rotatable wheel payout indicator in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area;

a random generator that randomly selects a payout amount;

a control unit operatively coupled to said random generator, said control unit comprising a motor and being operatively coupled to said rotatable wheel payout indicator, and an actuator button that, upon actuation by a player, causes said rotatable wheel payout indicator to rotate, said actuator button being placed in an operative state after a plurality of said reel symbols are displayed to the player, said control unit gradually reducing a rotational rate of said rotatable wheel payout indicator before said rotatable wheel payout indicator stops, based on an action performed by said random generator, after said payout amount has been selected, said control unit then causing said rotatable wheel payout indicator to stop at a stop position based on said selected payout amount.

2. A slot machine as defined in claim 1 wherein said rotatable wheel payout indicator is rotated after display of a winning indicia set of said reel symbols.

3. A slot machine, comprising:

a value-input device;

a plurality of first reel symbols;

a plurality of second reel symbols;

a plurality of third reel symbols;

a movable mechanical payout indicator comprising a rotatable wheel payout indicator having a face, said rotatable wheel payout indicator being rotatable about an axis that passes through said rotatable wheel payout indicator, a plurality of circumferentially arranged payout areas comprising a first payout area, a second payout area, and a third payout area, said circumferentially arranged payout areas being disposed on said face of said rotatable wheel payout indicator around said axis;

a plurality of payout amount symbols disposed on said rotatable wheel payout indicator in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area, a random generator that randomly selects a payout amount; and a control unit operatively coupled to said random generator, said control unit comprising a motor and being operatively coupled to said rotatable wheel payout indicator, said rotatable wheel payout indicator being rotated after a plurality of said reel symbols are displayed to a player, based on an action performed by said random generator, after said payout amount has been selected, said control unit then causing said rotatable wheel payout indicator to stop at a stop position based on said selected payout amount.

4. A slot machine as defined in claim 3 wherein said selected payout amount corresponds to a payout amount indicated by one of said payout amount symbols.

5. A slot machine as defined in claim 3 wherein said rotatable wheel payout indicator is rotated after display of a winning indicia set of said reel symbols.

6. A slot machine as defined in claim 3 additionally comprising a fourth payout area circumferentially arranged about said axis and a fourth payout amount symbol disposed in said fourth payout area.

7. A slot machine as defined in claim 6 wherein all payout amount symbols disposed on said rotatable wheel payout indicator are simultaneously visible to the player.

8. A slot machine as defined in claim 3 additionally comprising:

a first slot machine reel that is rotatable;

a second slot machine reel that is rotatable; and a third slot machine reel that is rotatable, wherein said plurality of first reel symbols are disposed on a circumferential surface of said first slot machine reel, wherein said plurality of second reel symbols are disposed on a circumferential surface of said second slot machine reel, and wherein said plurality of third reel symbols are disposed on a circumferential surface of said third slot machine reel.

9. A slot machine as defined in claim 8 wherein one of said first, second and third slot machine reels is rotatable about an axis that is not parallel to said axis about which said rotatable wheel payout indicator is rotatable.

10. A slot machine as defined in claim 3 additionally comprising an actuator button that, upon actuation by the player, causes said rotatable wheel payout indicator to rotate, said actuator button being placed in an operative state after a plurality of said reel symbols are displayed to the player.

11. A slot machine, comprising:

a value-input device;

a plurality of first reel symbols;

a plurality of second reel symbols;

a plurality of third reel symbols;

a payout indicator that is movable about an axis;

a plurality of payout areas comprising a first payout area, a second payout area, and a third payout area, said payout areas being circumferentially arranged about said axis;

a plurality of payout amount symbols disposed in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area;

a random generator that randomly selects a payout amount; and a control unit operatively coupled to said random generator and to said movable payout indicator, an actuator button that, upon actuation by a player, causes said movable payout indicator to move, said actuator button being placed in an operative state after a plurality of said reel symbols are displayed to the player, based on an action performed by said random generator, after said payout amount has been selected, said control unit then causing said movable payout indicator to stop at a stop position based on said selected payout amount.

12. A slot machine as defined in claim 11 wherein said selected payout amount corresponds to a payout amount indicated by one of said payout amount symbols.

13. A slot machine as defined in claim 11 wherein said movable payout indicator comprises a movable mechanical member and wherein said control unit comprises a motor.

14. A slot machine as defined in claim 11 wherein said movable payout indicator comprises a rotatable wheel and wherein said control unit comprises a motor.

15. A slot machine as defined in claim 11 additionally comprising:

a first slot machine reel that is rotatable;

a second slot machine reel that is rotatable; and a third slot machine reel that is rotatable, wherein said plurality of first reel symbols are disposed on a circumferential surface of said first slot machine reel, wherein said plurality of second reel symbols are disposed on a circumferential surface of said second slot machine reel, and wherein said plurality of third reel symbols are disposed on a circumferential surface of said third slot machine reel.

16. A slot machine as defined in claim 15 wherein one of said first, second and third slot machine reels is rotatable about an axis that is not parallel to said axis about which said movable payout indicator is movable.

17. A slot machine, comprising:

a value-input device;

a plurality of first reel symbols;

a plurality of second reel symbols;

a plurality of third reel symbols;

a payout indicator that is movable about an axis;

a plurality of payout areas comprising a first payout area, a second payout area, and a third payout area, said payout areas being circumferentially arranged about said axis;

a plurality of payout amount symbols disposed in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area;

a random generator that randomly selects a payout amount; and a control unit operatively coupled to said random generator and to said movable payout indicator.

said movable payout indicator being moved after a plurality of said reel symbols are displayed to a player, based on an action performed by said random generator, after said payout amount has been selected, said control unit then causing said movable payout indicator to stop at a stop position based on said selected payout amount.

18. A slot machine as defined in claim 17 wherein said selected payout amount corresponds to a payout amount indicated by one of said payout amount symbols.

19. A slot machine as defined in claim 17 wherein said movable payout indicator comprises a movable mechanical member and wherein said control unit comprises a motor.

20. A slot machine as defined in claim 17 wherein said movable payout indicator comprises a rotatable wheel and wherein said control unit comprises a motor.

21. A slot machine as defined in claim 17 wherein said movable payout indicator is moved after display of a winning indicia set of said reel symbols.

22. A slot machine as defined in claim 17 additionally comprising a fourth payout area circumferentially arranged about said axis and a fourth payout amount symbol disposed in said fourth payout area.

23. A slot machine as defined in claim 22 wherein all payout amount symbols are simultaneously visible to the player.

24. A slot machine as defined in claim 17 additionally comprising:

a first slot machine reel that is rotatable;

a second slot machine reel that is rotatable; and a third slot machine reel that is rotatable, wherein said plurality of first reel symbols are disposed on a circumferential surface of said first slot machine reel, wherein said plurality of second reel symbols are disposed on a circumferential surface of said second slot machine reel, and wherein said plurality of third reel symbols are disposed on a circumferential surface of said third slot machine reel.

25. A slot machine as defined in claim 24 wherein one of said first, second and third slot machine reels is rotatable about an axis that is not parallel to said axis about which said movable payout indicator is movable.

26. A slot machine as defined in claim 17 additionally comprising an actuator button that, upon actuation by the player, causes said movable payout indicator to move.

27. A slot machine, comprising:

a value-input device;

a plurality of first reel symbols;

a plurality of second reel symbols;

a plurality of third reel symbols;

a mechanical member that is movable about an axis;

a plurality of payout areas comprising a first payout area, a second payout area, and a third payout area, said payout areas being circumferentially arranged about said axis;

a plurality of payout amount symbols disposed in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area;

a random generator that randomly selects a payout amount;

a control unit operatively coupled to said random generator, said control unit comprising a motor and being operatively coupled to said movable mechanical member; and an actuator button that, upon actuation by a player, causes said movable mechanical member to move, said actuator button being placed in an operative state after a plurality of said reel symbols are displayed to the player, based on an action performed by said random generator after said payout amount has been selected, said control unit then causing said movable mechanical member to stop at a stop position based on said selected payout amount.

28. A slot machine as defined in claim 27 wherein said movable mechanical member comprises a rotatable wheel.

29. A slot machine as defined in claim 27 wherein said movable mechanical member is moved after display of a winning indicia set of said reel symbols.

30. A slot machine as defined in claim 27 additionally comprising a fourth payout area circumferentially arranged about said axis and a fourth payout amount symbol disposed in said fourth payout area.

31. A slot machine as defined in claim 30 wherein all payout amount symbols are simultaneously visible to the player.

32. A slot machine as defined in claim 27 additionally comprising:

a first slot machine reel that is rotatable;

a second slot machine reel that is rotatable; and a third slot machine reel that is rotatable, wherein said plurality of first reel symbols are disposed on a circumferential surface of said first slot machine reel, wherein said plurality of second reel symbols are disposed on a circumferential surface of said second slot machine reel, and wherein said plurality of third reel symbols are disposed on a circumferential surface of said third slot machine reel.

33. A slot machine as defined in claim 32 wherein one of said first, second and third slot machine reels is rotatable about an axis that is not parallel to said axis about which said movable mechanical member is movable.

34. A slot machine, comprising:

a value-input device;

a plurality of first reel symbols;

a plurality of second reel symbols;

a plurality of third reel symbols;

a mechanical member that is movable about an axis;

a plurality of payout areas comprising a first payout area, a second payout area, and a third payout area, said payout areas being circumferentially arranged about said axis;

a plurality of payout amount symbols disposed in said payout areas, said payout amount symbols including a first payout amount symbol comprising a numeral disposed in said first payout area, a second payout amount symbol comprising a numeral disposed in said second payout area, and a third payout amount symbol comprising a numeral disposed in said third payout area;

a random generator that randomly selects a payout amount; and a control unit operatively coupled to said random generator, said control unit comprising a motor and being operatively coupled to said movable mechanical member, said movable mechanical member being moved after a plurality of said reel symbols are displayed to a player, based on an action performed by said random generator, after said payout amount has been selected, said control unit then causing said movable mechanical member to stop at a stop position based on said selected payout amount.

35. A slot machine as defined in claim 34 wherein said movable mechanical member comprises a rotatable wheel.

36. A slot machine as defined in claim 34 wherein said movable mechanical member is moved after display of a winning indicia set of said reel symbols.

37. A slot machine as defined in claim 34 additionally comprising a fourth payout area circumferentially arranged about said axis and a fourth payout amount symbol disposed in said fourth payout area.

38. A slot machine as defined in claim 37 wherein all payout amount symbols are simultaneously visible to the player.

39. A slot machine as defined in claim 34 additionally comprising:

a first slot machine reel that is rotatable;

a second slot machine reel that is rotatable; and a third slot machine reel that is rotatable.

wherein said plurality of first reel symbols are disposed on a circumferential surface of said first slot machine reel, wherein said plurality of second reel symbols are disposed on a circumferential surface of said second slot machine reel, and wherein said plurality of third reel symbols are disposed on a circumferential surface of said third slot machine reel.

40. A slot machine as defined in claim 39 wherein one of said first, second and third slot machine reels is rotatable about an axis that is not parallel to said axis about which said movable mechanical member is movable.

41. A slot machine as defined in claim 34 additionally comprising an actuator button that, upon actuation by the player, causes said movable mechanical member to move.

42. A slot machine as defined in claim 34 said control unit gradually reduces a rotational rate of said rotatable wheel payout indicator before said rotatable wheel payout indicator stops.

* * * * *

UNITED STATES PATENT AND TRADEMARK OFFICE
CERTIFICATE OF CORRECTION

PATENT NO.    : 6,827,646 B2
DATED         : December 7, 2004
INVENTOR(S)   : William R. Adams It is certified that error appears in the above-identified patent and that said Letters Patent is hereby corrected as shown below:

<u>Title page,</u>
Item [63], Related U.S. Application Data, please delete "and a continuation-in-part" and insert -- which is a continuation-in-part -- therefor.
Item [56], References Cited, OTHER PUBLICATIONS, "Spanish Official Bulletin of Industrial Property" reference, please delete "193.376" and insert -- 293.376 -- therefor.

<u>Column 1,</u>
Line 4, please insert -- The present invention is directed to novel gaming devices and, more particularly, to gaming devices comprising at least primary and secondary events capable of providing at least one of a plurality of payouts. --.
Line 22, please delete "term" and insert -- terms -- therefor.

<u>Column 2,</u>
Line 30, please delete "stop" and insert -- stops -- therefor.

<u>Column 5,</u>
Line 16, please delete "in the form a" and insert -- in the form of a -- therefor.

<u>Column 9,</u>
Line 34, please delete "indicator," and insert -- indicator; -- therefor.

<u>Column 10,</u>
Line 6, please delete "area," and insert -- area; -- therefor.

<u>Column 12,</u>
Line 4, please delete "indicator." and insert -- indicator, -- therefor.

<u>Column 13,</u>
Line 16, please delete "generator" and insert -- generator, -- therefor.

UNITED STATES PATENT AND TRADEMARK OFFICE
CERTIFICATE OF CORRECTION

PATENT NO.     : 6,827,646 B2
DATED          : December 7, 2004
INVENTOR(S)    : William R. Adams It is certified that error appears in the above-identified patent and that said Letters Patent is hereby corrected as shown below:

Column 14,
Line 40, please delete "rotatable." and insert -- rotatable, -- therefor.
Line 57, please delete "claim 34" and insert -- claim 35 -- therefor.

Signed and Sealed this

Twelfth Day of April, 2005

JON W. DUDAS
*Director of the United States Patent and Trademark Office*